United States Patent [19]

Sommargren

[11] Patent Number: 4,606,638

[45] Date of Patent: Aug. 19, 1986

[54] DISTANCE MEASURING INTERFEROMETER AND METHOD OF USE

[75] Inventor: Gary E. Sommargren, Madison, Conn.

[73] Assignee: Zygo Corporation, Middlefield, Conn.

[21] Appl. No.: 548,248

[22] Filed: Nov. 3, 1983

[51] Int. Cl.[4] .............................................. G01B 9/02
[52] U.S. Cl. .................................... 356/351; 356/358
[58] Field of Search ............... 356/349, 351, 357, 358, 356/359, 360

[56] References Cited

U.S. PATENT DOCUMENTS 3,694,088  9/1972  Gallagher et al. .
3,855,625  12/1974 Garnier et al. .
4,201,473  5/1980  Domenicali et al. .
4,225,240  9/1980  Balasubramanian .
4,325,637  4/1982  Moore .

OTHER PUBLICATIONS

Bowen et al., "Interferometer Alignment Tool", *IBM Tech. Discl. Bull.*, vol. 15, No. 12, pp. 3691-3692, 5/73.
Andrews, "An Optical Technique for Analysis of the Behaviour of Flying Heads in Computer Disc Files", *Proc. ICO Conf. Opt. Meths. in Sci. and Ind. Meas.* Tokyo, 1974, in *Japan J. Appl. Phys.*, vol. 14 Suppl. 14-1, pp. 373-377, 1975.
Sommargren et al., "Linear Phase Microscopy", *Applied Optics*, vol. 12, No. 9, pp. 2130-2138, 9/73.
Bruning et al., "Digital Wavefront Measuring Interferometer for Testing Optical Surfaces and Lenses", *Applied Optics*, vol. 13, No. 11, pp. 2693-2703, 11/74.
Sommargren, "Up/Down Frequency Shifter for Optical Heterodyne Interferometry", *JOSA*, vol. 65, No. 8, pp. 960-961, 8/75.
Massie et al., "High-Performance Real-Time Heterodyne Interferometry", *Applied Optics*, vol. 18, No. 11, pp. 1797-1803, 6/79.
Schaham, "Precision Optical Wavefront Measurement", *Proc. SPIE*, vol. 306, pp. 183-191, 1981.
Zanoni, *The Optical Industry and System Purchasing Directory*, pp. E-80-E-82, 1983.
Hu, "Polarization Heterodyne Interferometry Using a Simple Rotating Analyzer I. Theory and Error Analysis", *Applied Optics*, vol. 22, No. 13, pp. 2052-2056, 7/83.
Truax et al., "Laser Doppler Velocimeter for Velocity and Length Measurements of Moving Surfaces", *Applied Optics*, vol. 23, No. 1, pp. 67-73, 1/84.

*Primary Examiner*—Davis L. Willis
*Assistant Examiner*—Matthew W. Koren
*Attorney, Agent, or Firm*—Stiefel, Gross, Kurland & Pavane

[57] ABSTRACT

Apparatus is disclosed for the measurement of the absolute distance between a plano test and a plano reference surface which are in close proximity to each other. The preferred way of accomplishing this is with a polarization phase modulated Fizeau interferometer in which the reference surface is a front surface polarizer. The modulated interference pattern is photosensed with an array camera, and the signals processed to provide the absolute distance between the plano test surface and the plano reference surface. A method is also disclosed, using the instant invention, for determining the flying height of a magnetic head assembly used in computer mass storage systems.

5 Claims, 7 Drawing Figures

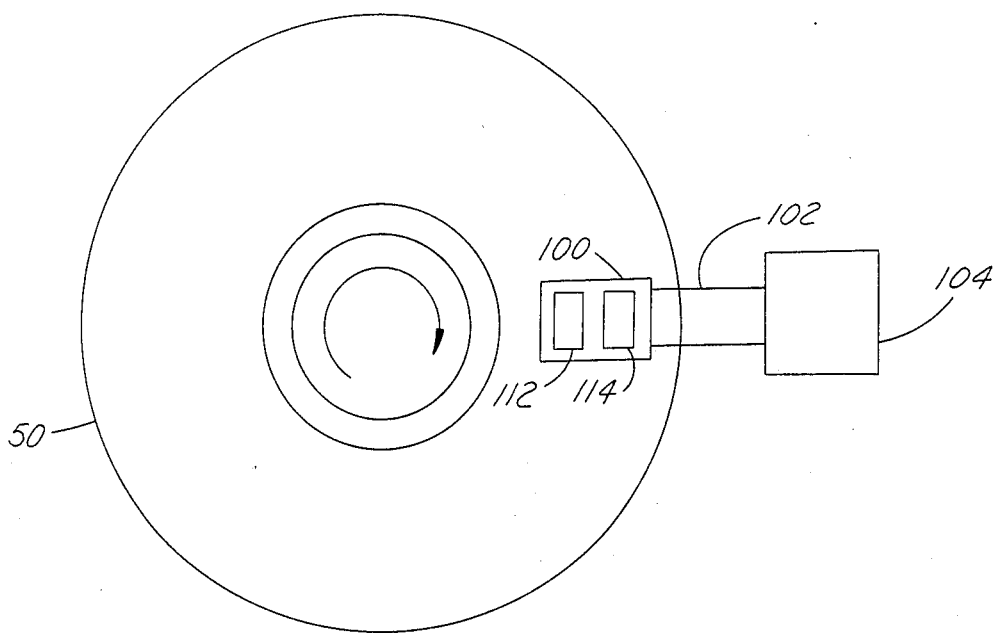
FIGURE 4(b)-TOP
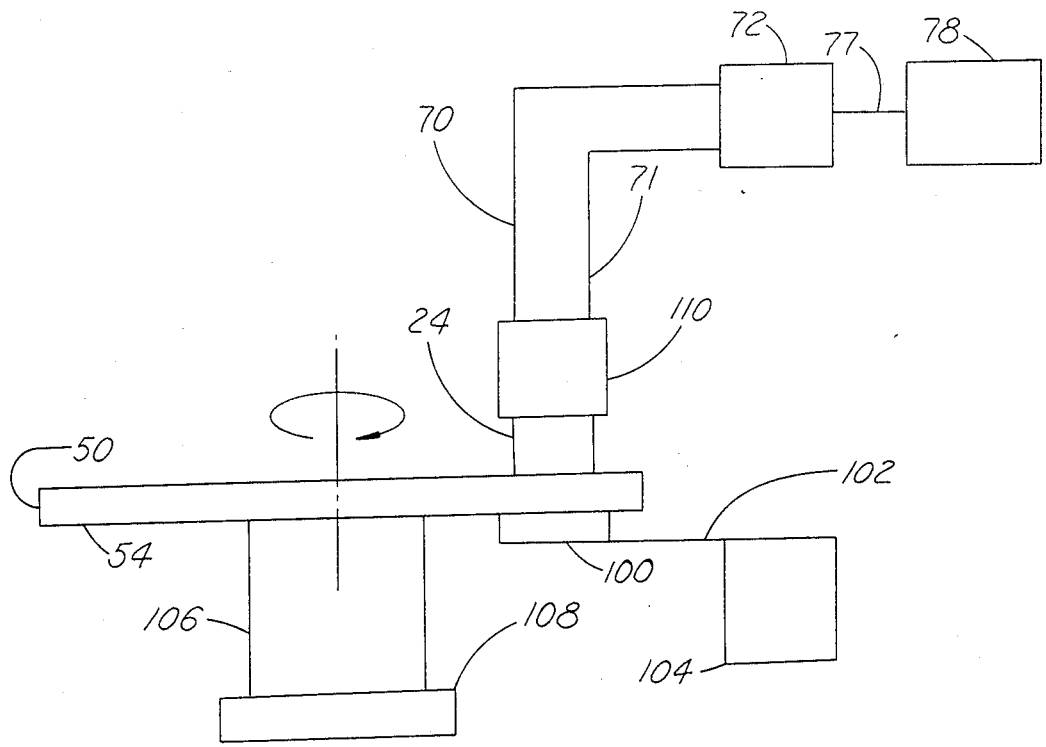
FIGURE 4(a)-SIDE

DISTANCE MEASURING INTERFEROMETER AND METHOD OF USE

BACKGROUND OF THE INVENTION

1. Field of the Invention

The present invention relates to an apparatus and method for interferometrically measuring the absolute distance between a plano test surface and a plano reference surface which are in close proximity to each other. More particularly, the invention relates to apparatus which rapidly and accurately measures said absolute distance and which requires no physical contact with the surface under test.

2. The Prior Art

Interferometers are generally known for determining distances and the topography of a test surface; see, for example, C. Zanoni, "Interferometry," *The Optical Industry and Systems Purchasing Directory*, Book 2, pp. E-80–E-82 (1983). Interferometry relies ultimately on the measurement of phase. In traditional interferometry, the measurement of phase is derived from the geometry of the fringe pattern.

Phase measuring interferometry ascertains the phase at each point in the interference pattern by measuring the corresponding intensity variation as the overall phase is modulated. The phase must be modulated by $2\pi$ in a precisely known way so as not to introduce errors in the measured intensities, see for example, J. H. Bruning, et al., "Digital Wavefront Measuring Interferometer for Testing Optical Surfaces and Lenses," *Applied Optics*, vol. 13, pp. 2693–2703 (1974); Gallagher, et al., U.S. Pat. No. 3,694,088 issued Sept. 26, 1972; N. Balasubramanian, U.S. Pat. No. 4,225,240 issued Sept. 30, 1980; M. Schaham, "Precision optical wavefront measurement," *Proceedings SPIE*, vol. 306, pp. 183–191 (1981); and H. Z. Hu, "Polarization heterodyne interferometry using a simple rotating analyzer. 1: Theory and error analysis," *Applied Optics*, vol. 22, pp. 2052–2056 (1983).

In prior-art phase measuring interferometers, the phase is modulated by a known amount by one of the following means: (1) mechanically moving an optical element of the interferometer with a piezoelectric transducer, (2) rotating a phase retardation plate in the interferometer, (3) use of either an acousto-optic, electro-optic, or similar device in the interferometer, and (4) variation of the incident angle, see for example, R. C. Moore, U.S. Pat. No. 4,325,637 issued Apr. 20, 1982.

In my copending application, Ser. No. 515393, "Interferometric Wavefront Measurement," assigned to the assignee of this application, an improved phase modulation apparatus and method is disclosed; however, it cannot be used in either an equal path interferometer or an interferometer with a cavity length equal to or less than the optical length of the diode laser.

While the prior-art fringe pattern and phase measuring interferometers are useful for many applications, they cannot be used for some measurements. For example, in the computer mass storage system industry it is required to measure the flying height of a magnetic head assembly on a rapidly rotating disk in order to verify the performance of the magnetic head assembly. The flying height is the distance between the magnetic head assembly's rails, also referred to as air bearing surfaces, and the surface of the rotating disk, see M. F. Garnier, et al., U.S. Pat. No. 3,855,625 issued Dec. 17, 1974. The flying height results from the aerodynamic effects produced by the disk's rotation and ranges from 0.1 to 0.25 micrometers. In addition to the flying height, it is desirable to measure the topography as well as the angular orientation of the rails, or portions thereof, in order to assess the compliance of these parameters to the design specifications. It is desirable to measure the aforementioned parameters quickly and automatically with minimum operator intervention. For this application, the distance to be measured is nominally less than one-half of a wavelength of visible light, and the absolute distance must be measured.

Prior-art apparatus and methods for measuring the flying height of a magnetic head assembly have included: (a) visual assessment of the color bands produced by white light interferometry, (b) multiple wavelength interferometry, and (c) capacitive-type sensors. The prior-art optical techniques have generally measured the flying height of a magnetic head assembly using a rapidly rotating glass disk, one surface of which is a reference surface of an interferometer. White light interferometry suffers from a number of limitations; first, as the flying height gets below one-half a wavelength of light, i.e., approximately 0.3 micrometers, only limited and ambiguous information is available; second, it does not lend itself to automated operation for high through-put production testing. A single manufacturer typically produces 200,000 to 500,000 magnetic head assemblies per month. Similarly, the multiple wavelength interferometry technique suffers from the same limitations. The capacitive sensor approach is suitable for some laboratory testing but requires that a capacitive transducer be added to the magnetic head assembly to be tested. For production testing this is neither practical nor cost effective. Furthermore, all of the aforementioned techniques provide poor spatial data sampling.

While prior-art fringe pattern and phase measuring interferometers are useful for many applications, they cannot measure the absolute distance between a plano test surface and a plano reference surface which are in close proximity to each other.

OBJECT OF THE INVENTION

In view of the foregoing, it is the main object of this invention to provide an improved apparatus and method for measuring the absolute distance between a plano test surface and a plano reference surface which are in close proximity to each other.

Another object of the invention is to provide an apparatus and method which precisely, automatically, and rapidly measures the flying height of a magnetic head assembly used in computer mass storage systems.

Another object of the invention is to provide an apparatus and method which obviates the need to mechanically modulate an optical element of the interferometer cavity.

Another object of the invention is to provide an apparatus and method in which the fringe contrast can always be adjusted to unity regardless of the reflectivities of the reference and test surfaces.

Another object of the invention is to provide an apparatus and method in which the phase modulation is the same over the entire measurement aperture of the interferometer.

STATEMENT OF THE INVENTION

In accordance with the instant invention, I provide an optical interferometer system capable of measuring the absolute distance between a plano test surface and a plano reference surface which are in close proximity to each other comprising: (1) a source of a beam of coherent, single wavelength, linearly polarized energy, most preferably a laser; (2) means for varying the relative phase of the orthogonal polarization components of said beam; (3) means for spatially filtering and expanding the diameter of said beam; (4) means, most preferably a surface polarizer coating on a transparent substrate which is the reference surface in a Fizeau interferometer, for converting said expanded beam into a reference wavefront comprised of one of the polarization components and a measurement wavefront comprised of the other polarization component; (5) means, most preferably a polarizer, for producing an interference pattern between said reference wavefront and said measurement wavefront after it interacts with the test surface; (6) means, preferably a solid state array camera, for photosensing the radiant energy of said interference pattern over a two-dimensional array of points over a time period of at least one full cycle of said phase modulation; (7) means for imaging the test surface onto the photosensitive surface of said camera; (8) means for converting said photosensed radiant energy in said interference pattern into the absolute distance between the test surface and said reference surface.

This invention includes a method to rapidly measure the flying height of a magnetic head assembly's rails over a rotating recording disk used in computer mass storage systems, in which (1) said recording disk is replaced by a transparent disk one surface of which is used as a reference surface in a Fizeau interferometer (2) said magnetic head assembly is placed against said reference surface (3) said transparent disk is rotated at the same speed used to rotate said recording disk so that said magnetic head assembly's rails assume the flying height assumed in actual use to become the test surface in said Fizeau interferometr (4) a beam of coherent, single wavelength, linearly polarized energy, most preferably a laser beam, is provided (5) the relative phase of the orthogonal polarization components of said beam is varied (6) said beam is spatially filtered and its diameter expanded (7) said expanded beam is converted into a reference wavefront comprised of one of the polarization components and a measurement wavefront comprised of the other polarization component, most preferably by the use of a surface polarizer coating on said reference surface, (8) after said measurement wavefront interacts with the test surface, an interference pattern between said reference wavefront and said measurement wavefront is produced, most preferably by a polarizer, (9) the radiant energy of said interference pattern is photosensed over a two-dimensional array of points over a time period of at least one full cycle of said phase modulation, most preferably by a solid state array camera, (10) the test surface is imaged onto the photosensitive surface of said photosensing means and (11) said photosensed radiant energy in said interference pattern is converted into the absolute distance between said magnetic head assembly's rails and said reference surface.

THE DRAWINGS

In the drawings,

FIG. 1 depicts in schematic form an embodiment of the instant invention.

FIG. 2 shows three phase modulation waveforms. FIG. 2(a) shows the phase modulation waveform for a dynamic phase measurement method where the phase change is a linear, monotonic function. FIG. 2(b) shows the phase modulation waveform for a dynamic phase measurement method where the phase change is a linear, periodic function. FIG. 2(c) shows the phase modulation waveform for a static phase measurement method.

FIG. 4 depicts in schematic form an embodiment of the instant invention for the measurement of the flying height of a magnetic head assembly. FIG. 4(a) is a partial side view and FIG. 4(b) is a top view, partially schematic.

DETAILED DESCRIPTION OF THE INVENTION

Figure 1:
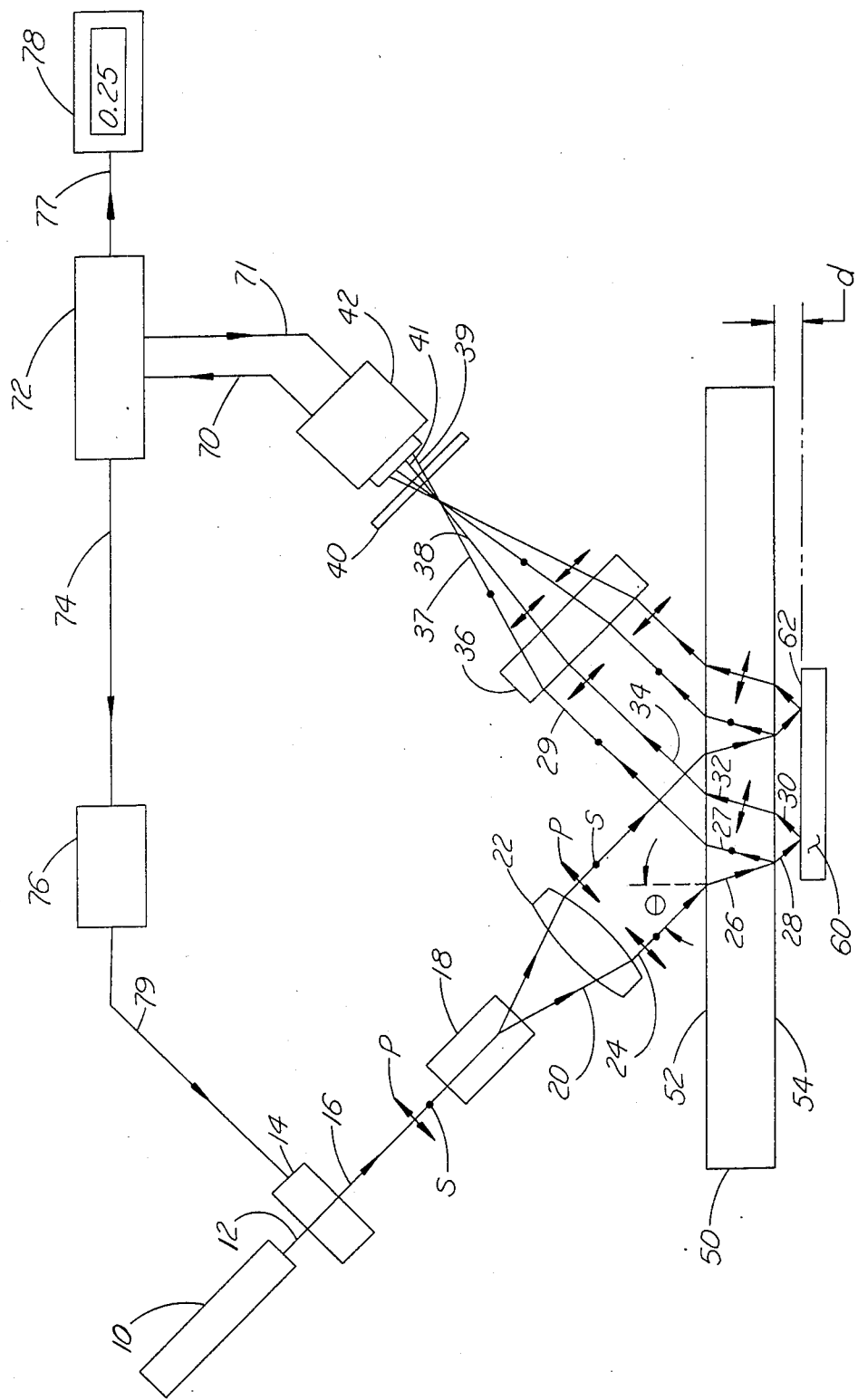
Figure 2A:
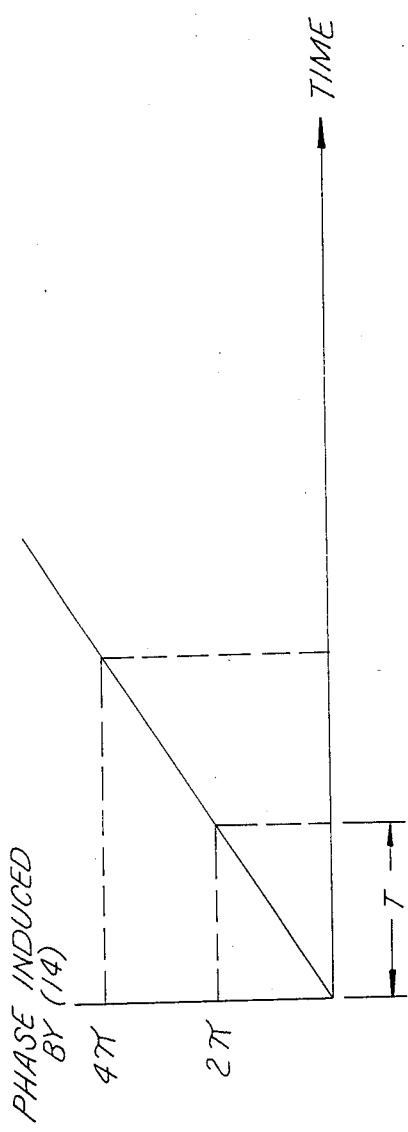

FIG. 1 depicts in schematic form an embodiment of the instant invention. While the apparatus has application for a wide range of radiation sources, the following description is taken by way of example with respect to an optical measuring system. The term "radiant energy" as used herein includes, but is not limited to, electromagnetic energy of all frequency ranges. A light source (10), most preferably a laser, provides coherent optical energy of single wavelength and linear polarization for the narrow nearly collimated beam (12). Phase shifter (14) varies the relative phase of the orthogonal polarization components of beam (12) to produce beam (16). Phase shifter (14) could also be placed after the imaging system (36). Depending on its location, phase shifter (14) may be any of the following: (a) a PZT driven corner cube or mirror (see, for example, B. E. Truax et al., "Laser Doppler Velocimeter for Velocity and Length Measurements of Moving Surfaces," *Applied Optics*, in publication), (b) a rotating, either continuously or discretely, half-wave phase retardation plate (see, for example, G. E. Sommargren, "Up/Down Frequency Shifter for Optical Heterodyne Interferometry," *Journal of the Optical Society of America*, vol. 65, p. 960 (1975)), (c) acousto-optic modulators (see, for example, N. A. Massie et al., "High Performance Real-Time Heterodyne Interferometry," *Applied Optics*, vol. 18, p. 1797 (1979)) or (d) a rotating polarizer (see, for example, G. E. Sommargren and B. J. Thompson, "Linear Phase Microscopy," *Applied Optics*, vol. 12, p. 2130 (1973)). The spatial filter-beam diverger (18) converts beam (16) into a diverging spherical wavefront (20). The spatial filter-beam diverger (18), as is well known, uses an internal lens system and a small aperture located at the focus of the lens system to eliminate spurious beams and artifacts which are frequently found to accompany the principal output beam of a laser. Collimating lens (22) converts the diverging wavefront (20) to a plano wavefront (24). Plano wavefront (24) enters the optical element (50) at an angle $\theta$ to the normal to surface (52) of element (50). Optical element (50) is made of a material which transmits the wavefront (26). Surfaces (52) and (54) are plano and parallel. Surface (54) is the reference surface for the Fizeau interferometer cavity and, thusly, must be made to a flatness tolerance consistent with the measurement tolerances desired. Preferably, surface (52) has an antireflection coating so that essentially all of plano wavefront (24) is refracted onto element (50) as plano wavefront (26) and essentially none of wavefront (24) is reflected by surface (52). Surface (54) of optical element (50) is coated so that it is a surface polarizer. A surface polarizer transmits the p polarization component of the wavefront (26) and reflects the s polarization component of the wavefront (26). The p label denotes the polarization component in the plane defined by the incident wavefront and the normal to the surface (54). The s label denotes the polarization component perpendicular to the plane defined by the incident wavefront and the normal to the surface (54). Thusly, surface (54) is the reference surface for a Fizeau interferometer. Surface (54) converts wavefront (26) into a p polarization measurement wavefront (28) and an s polarization reference wavefront (27). The measurement wavefront (28) is reflected by the test surface (62) of the article under test (60) to produce wavefront (30) which is refracted by surface (54) to produce wavefront (32). Wavefronts (27) and (32) emerge from element (50) as wavefronts (29) and (34) respectively. Imaging system (36) images the surface under test (62) onto the photosensitive surface of device (42), and in doing so converts wavefronts (29) and (34) into wavefronts (37) and (38), respectively. The amplitudes of wavefronts (37) and (38) are given, respectively, as $$V_r(x,y;t) = R_r e^{i[kz_r(x,y) - \omega t]} \quad (1)$$

and $$V_t(x,y;t) = R_t e^{i[kz_t(x,y) - \omega t + \phi]} \quad (2)$$

where $R_r$ and $R_t$ are the reflectivities of the reference and test surfaces, respectively, $k = (2\pi)/\lambda$ ($\lambda$ is the wavelength of beam (12)), $z_r(x,y)$ and $z_t(x,y)$ are the optical path lengths traveled by each wavefront, $\omega$ is the angular frequency of the beam (12), t is time, and $\phi$ is the phase shift between the two wavefronts. The optical path lengths, $z_r(x,y)$ and $z_t(x,y)$, are related by $$z_t(x,y) = z_r(x,y) + 2d(x,y) \cos \theta \quad (3)$$

where d(x,y) is the distance between the surfaces (54) and (62) and $\theta$ is the angle of incidence. The phase shift can be written more explicitly as $$\phi = \phi_o - \omega' t \quad (4)$$

where $\phi_o$ is a constant offset due to the material properties and $\omega' t$ is the linear phase modulation induced by the phase shifter (14) as shown in FIG. 2(a).

Each wavefront, i.e. (37) and (38) passes through the polarizer (40), which is oriented at an angle $\alpha$ with respect to the polarization of $V_r$. The transmitted wavefronts are thus converted to the same polarization resulting in wavefronts (39) and (41) which form an interference pattern on photosensing device (42). Their combined amplitude is given by $$V(x,y;t) = V_r \cos\alpha + V_t \sin\alpha \quad (5)$$
$$= R_r \cos\alpha e^{i(kz_r - \omega t)} + R_t \sin\alpha e^{i(kz_t - \omega t + \phi)}.$$

The angle $\alpha$ is chosen so that amplitudes of each component are equal, i.e. $R_r \cos\alpha = R_t \sin\alpha \equiv R$. This angle is determined by, $$\alpha = \tan^{-1}[(R_r)/(R_t)] \quad (6)$$

This assures a fringe contrast of unity. The intensity of the resultant interference pattern formed on device (42) is given by, $$I(x,y;t) = |V(x,y;t)|^2 \quad (7)$$
$$= 2R^2 \{1 + \cos[k(z_t - z_r) + \phi]\}$$
$$= 2R^2 \left\{ 1 + \cos\left[ \frac{4\pi d(x,y)\cos\theta}{\lambda} + \phi_o - \omega' t \right] \right\}$$

Device (42) can be a solid state camera with either CCD, CID, MOS or photodiode photosensitive elements in a two-dimensional array. Device (42) may alternatively be a linear array with either the interference pattern or the array scanned in a direction orthogonal to the length of the array for some applications. When the surfaces (54) and (62) of the interferometer are properly aligned, a modulated interference pattern is produced on the photosensitive surface of device (42). The details for aligning an interferometer, if required, are disclosed in Domencalli and Hunter, U.S. Pat. No. 4,201,473 issued May 6, 1980. Output (70) provides the photosignals from the array of pixels of device (42) to the electronic processor (72). Electronic signals (71) are provided by the processor (72) to control the device (42) if needed. The description of FIG. 3 provides the functional details of the electronic processor (72). The signal (74) from the electronic processor (72) is fed into the phase shifter driver (76). The output (79) of the phase shifter driver (76) is fed into the phase shifter (14). The resultant phase shift is shown in FIG. 2. The distance d(x,y) can be found by scanning the device (42) N times during a modulation period T ($T = [(2\pi)/\omega']$), see FIG. 2(a). During the time interval T/N, each pixel integrates the fringe pattern intensity, I(x,y;t), to produce integral B(0), B(1), . . . , B(N-1). B(k) is generally given by $$B(k) = 2R^2 \int_{[(2k-1)T/N]}^{[(2k+1)T/N]} [1 + \cos(\Omega - \omega' t)] \, dt \quad (8)$$
$$= 2R^2 T[(1/N) + (1/\pi)[\sin(\pi/N)] \cos\{[(2\pi k)/N] - \Omega\}]$$

where $\Omega = \{[4\pi d(x,y) \cos\theta]/\lambda\} + \phi_o$.
When $N = 4$ $$B(0) = 2R^2 T \left[ (\tfrac{1}{4}) + \frac{\sqrt{2}}{2\pi} \cos\Omega \right] \quad (9)$$

$$B(1) = 2R^2 T \left[ (\tfrac{1}{4}) + \frac{\sqrt{2}}{2\pi} \sin\Omega \right] \quad (10)$$

$$B(2) = 2R^2 T \left[ (\tfrac{1}{4}) - \frac{\sqrt{2}}{2\pi} \cos\Omega \right] \quad (11)$$

$$B(3) = 2R^2 T \left[ (\tfrac{1}{4}) - \frac{\sqrt{2}}{2\pi} \sin\Omega \right] \quad (12)$$

Solving Eqs. (9)–(12) for the argument, $\Omega$, gives $$\frac{4\pi d(x,y)\cos\theta}{\lambda} + \phi_o = \tan^{-1}\left[\frac{B(1) - B(3)}{B(0) - B(2)}\right]. \quad (13)$$

The distance, d, is then given by $$d(x,y) = \frac{\lambda}{4\pi\cos\theta}\left(\tan^{-1}\left[\frac{B(1) - B(3)}{B(0) - B(2)}\right] - \phi_o\right). \quad (14)$$

All quantities on the right side of this equation are known or measured except $\phi_o$. This constant can be determined beforehand by placing a test surface of the same material directly on the reference surface (d=0), measuring B(0) through B(4) and solving Eq. (14) for $\phi_o$. The mathematical relations provided above are implemented in the software executed by microprocessor (88), see description of FIG. 3. The output (77) of the electronic processor (72) is fed into an output device (78) which can be either a digital display as shown or a printer.

Figure 2B:
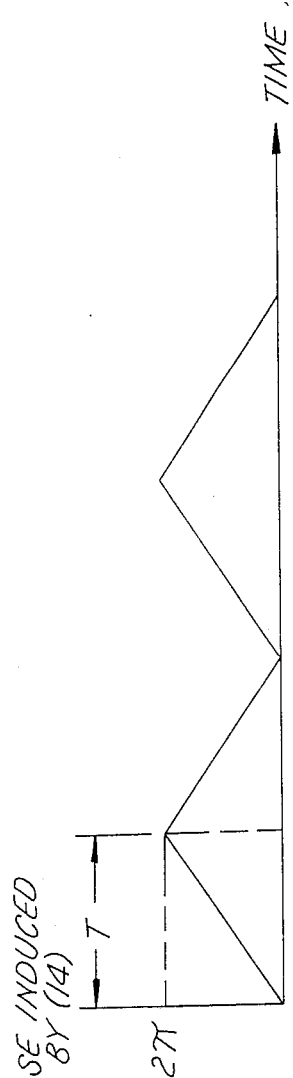
Figure 2C:
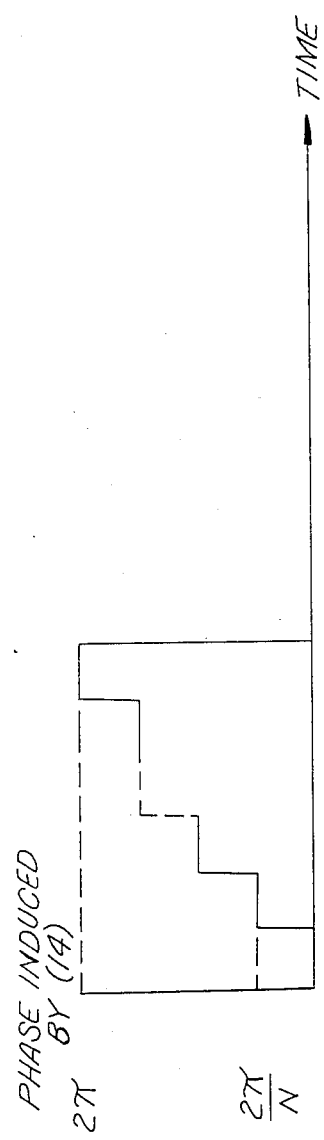
Figure 3:
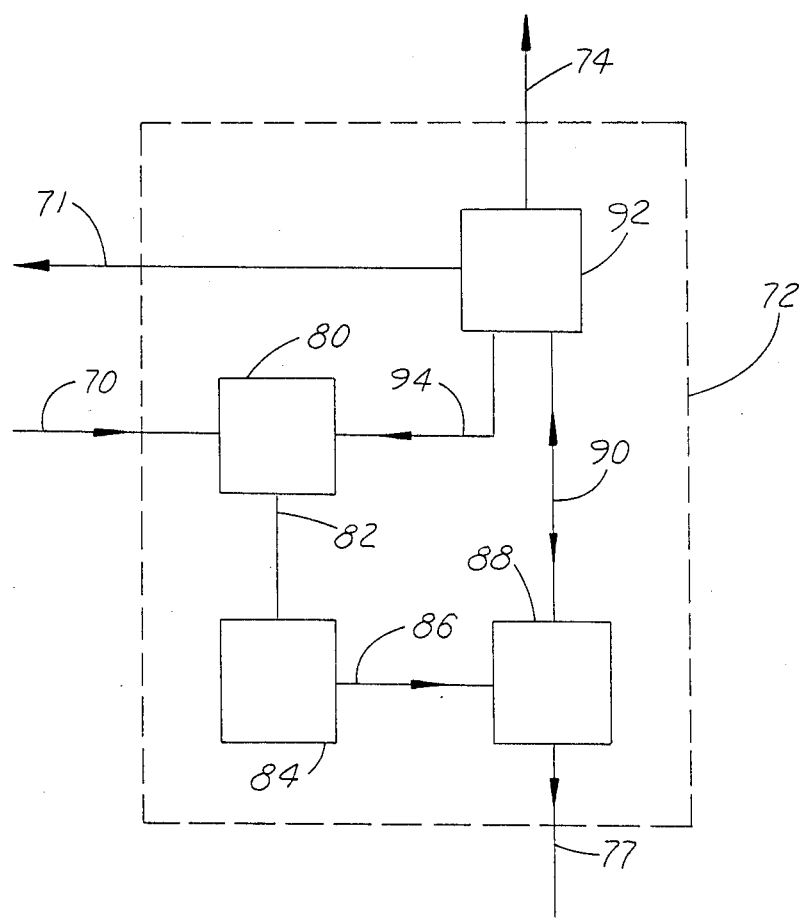
FIG. 3 depicts a schematic block diagram of the circuitry used in the electronic processor in one embodiment of the instant invention.

FIG. 2 shows three phase modulation waveforms. FIG. 2(a) shows the phase modulation waveform for a dynamic phase measurement method where the phase change is a linear, monotonic function. FIG. 2(b) shows the phase modulation waveform for a dynamic phase measurement method where the phase change is a linear, periodic function. FIG. 2(c) shows the phase modulation waveform for a static phase measurement method.

FIG. 3 depicts a schematic block diagram of the circuitry used in the electronic processor (72) in one embodiment of the invention.

In FIG. 3, the output (70) of device (42) is fed into the analog-to-digital (A/D) converter (80) to provide the digital signal (82) which is stored in memory (84). The microprocessor (88) not only manipulates the data stored in memory (84), received via digital signal (86), but also provides and receives signals (90) with the measurement control unit (92) and provides an output signal (77) to the output device (78) which may be either a digital display or a printer, for example. The measurement control unit (92) provides (a) a waveform signal (74) to the phase shifter driver (76); (b) a clock signal (71) to the device (42); and (c) a synchronization signal (94) to the A/D converter (80).

FIG. 4 depicts in schematic form an embodiment of the instant invention for the measurement of the flying height of a magnetic head assembly. FIG. 4(a) is a partial side view and FIG. 4(b) is a top view, partially schematic.

In FIG. 4(a), the glass disk (50) is mounted on precision bearing (106). Motor (108) rotates the glass disk as shown. The magnetic head assembly (100) is supported from the base (104) by a flexure element (102). The unit (110) is comprised of the optical/mechanical elements in FIG. 1 of the instant invention. The measurement wavefront (24) illuminates the reference surface (54) of the glass disk (50) and the rails (112) and (114), see FIG. 4(b) of the magnetic head assembly (100). The function of elements (70), (71), (72), (77), and (78) are described in the description of FIG. 1.

In FIG. 4(b), a top view, partially schematic, is depicted to show, not to scale, the measurement arrangement.

For some applications it is desirable to reduce or destroy the coherence length of the radiant energy. The instant invention can readily be so modified without departing from the scope of the invention using a suitable device, such as a rotating ground glass, suitably placed in the interferometer. For example, the coherence length of the radiant energy can be reduced or destroyed either before it enters the interferometer cavity, e.g., see Moore, op. cit., or after the reference and measurement wavefronts are combined to form an interference pattern, e.g. see Domenicalli and Hunter, op. cit.

For some applications it may be desirable to vary the relative phase of the orthogonal polarization components of the measurement and reference wavefronts after, rather than before, the Fizeau interferometer. The instant invention can readily be so modified without departing from the scope of the invention.

While a preferred embodiment of the invention has been disclosed, obviously modification can be made therein without departing from the scope of the invention as defined in the following claims.

What is claimed:

1. An optical interferometer system capable of measuring the absolute distance between a plano test surface and a plano reference surface which are in close proximity to each other comprising: (1) a source of a beam of coherent, single wavelength, linearly polarized energy; (2) means for varying the relative phase of the orthogonal polarization components of said beam; (3) means for spatially filtering and expanding the diameter of said beam; (4) means for converting said expanded beam into a reference wavefront comprised of one of the polarization components and a measurement wavefront comprised of the other polarization component, said expanded beam converting means (4) comprising a surface polarizer coating on a transparent substrate which is the reference surface in a Fizeau interferometer; (5) means for producing an interference pattern between said reference wavefront and said measurement wavefront after it interacts with the test surface; (6) means for photosensing the radiant energy of said interference pattern over a two-dimensional array of points over a time period of at least one full cycle of said phase modulation; (7) means for imaging the test surface onto the photosensitive surface of said camera; and (8) means for converting said photosensed radiant energy in said interference pattern into the absolute distance between the test surface and said reference surface.

2. The system of claim 1, in which said source (1) is a laser.

3. The system of claim 1, in which said means (5) is a polarizer.

4. The system of claim 1, in which means (6) is a solid state array camera.

5. A method of rapidly measuring the flying height of a magnetic head assembly's rails over a rotating magnetic recording disk used in computer mass storage systems, in which (1) said recording disk is replaced by a transparent disk one surface of which is used as a reference surface in a Fizeau interferometer (2) said magnetic head assembly is placed against said reference surface (3) said transparent disk is rotated at the same speed used to rotate said recording disk so that said magnetic head assembly's rails assume the flying height assumed in actual use to become the test surface in said Fizeau interferometer (4) a beam of coherent, single wavelength, linearly polarized energy is provided, (5) the relative phase of the orthogonal polarization components of said beam is varied (6) said beam is spatially filtered and its diameter expanded (7) said expanded beam is converted into a reference wavefront comprised of one of the polarization components and a measurement wavefront comprised of the other polarization component (8) after said measurement wavefront interacts with the test surface, an interference pattern between said reference wavefront and said measurement wavefront is produced (9) the radiant energy of said interference pattern is photosensed over a two-dimensional array of points over at time period of at least one full cycle of said phase modulation (10) the test surface is imaged onto the photosensitive surface of said photosensing means and (11) said photosensed radiant energy in said interference pattern is converted into the absolute distance between said magnetic head assembly's rails and said reference surface.

* * * * *